US012030137B2

(12) United States Patent
Nomura et al.

(10) Patent No.: US 12,030,137 B2
(45) Date of Patent: Jul. 9, 2024

(54) LASER PROCESSING APPARATUS AND METHOD OF ADJUSTING PHASE PATTERN

(71) Applicant: DISCO CORPORATION, Tokyo (JP)

(72) Inventors: Teppei Nomura, Tokyo (JP); Atsushi Ueki, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 118 days.

(21) Appl. No.: 17/090,008

(22) Filed: Nov. 5, 2020

(65) Prior Publication Data
US 2021/0146482 A1 May 20, 2021

(30) Foreign Application Priority Data
Nov. 15, 2019 (JP) ................................. 2019-207274

(51) Int. Cl.
B23K 26/70 (2014.01)
B23K 26/06 (2014.01)
B23K 101/40 (2006.01)

(52) U.S. Cl.
CPC ........ B23K 26/707 (2015.10); B23K 26/0643 (2013.01); B23K 26/0648 (2013.01); B23K 26/0665 (2013.01); B23K 26/705 (2015.10); B23K 2101/40 (2018.08)

(58) Field of Classification Search
CPC ........................... B23K 26/707; B23K 26/705; B23K 26/0648; B23K 2101/40; B23K 26/032; B23K 26/04; B23K 26/0643; B23K 26/0665
See application file for complete search history.

(56) References Cited
U.S. PATENT DOCUMENTS

| 2006/0285100 A1* | 12/2006 | Hamatani | G03F 7/7085 355/53 |
| 2010/0059490 A1 | 3/2010 | Unrath et al. | |
| 2011/0000987 A1* | 1/2011 | Fujioka | C11D 11/0088 241/15 |
| 2014/0307299 A1* | 10/2014 | Matsumoto | B23K 26/064 359/238 |

(Continued)

FOREIGN PATENT DOCUMENTS

| JP | 2002192370 A | 7/2002 |
| JP | 2014236795 A | 12/2014 |
| JP | 2016041437 A | 3/2016 |

OTHER PUBLICATIONS

Office Action issued in counterpart Singapore patent application No. 10202010593Y, dated Nov. 1, 2021.

Primary Examiner — Janie M Loeppke
(74) Attorney, Agent, or Firm — Greer Burns & Crain Ltd.

(57) ABSTRACT

A laser processing apparatus includes a laser beam applying unit for applying a laser beam to a workpiece, and a control unit. The laser beam applying unit includes a laser oscillator for emitting a laser, a condensing lens, a concave mirror having a focal point at a focused spot of the condensing lens and having a spherical reflecting surface, a beam splitter for transmitting therethrough the laser beam emitted from the laser oscillator toward the condensing lens and branching off a reflected beam, and a wavefront measuring unit for receiving the reflected beam and acquiring wavefront data. The control unit changes a phase pattern to be displayed on a display portion of a spatial light modulator on the basis of the wavefront data.

6 Claims, 10 Drawing Sheets

(56) References Cited

U.S. PATENT DOCUMENTS

2015/0301256 A1* 10/2015 Takiguchi ............ G02B 21/365
 359/9
2016/0045980 A1* 2/2016 Asano .................. B23K 26/705
 219/121.74

* cited by examiner

ASTIGMATISM 0°

LASER PROCESSING APPARATUS AND METHOD OF ADJUSTING PHASE PATTERN

BACKGROUND OF THE INVENTION

Field of the Invention

The present invention relates to a laser processing apparatus and a method of adjusting a phase pattern.

Description of the Related Art

There is known in the art a laser processing method for applying a laser beam to a plate-shaped workpiece such as a semiconductor wafer along projected dicing lines thereon to form modified layers in the workpiece that act as division initiating points in order to divide the workpiece into individual device chips (see, for example, Japanese Patent No. 3408805).

The above laser processing method is carried out by a laser processing apparatus having an optical system including various optical components. The various optical components that range from a laser oscillator to a condensing lens tend to produce various optical distortions in the optical path from the laser oscillator to the condensing lens. Those optical distortions are likely to cause different laser processing apparatus to develop different processed results.

One technology proposed to obviate the above shortcoming attempts to hold a concave mirror on a chuck table and capture an image of light reflected by the concave mirror to grasp the shape of a spot where a workpiece on the chuck table is processed (see, for example, JP 2016-41437A). However, the technology disclosed in JP 2016-41437A is problematic in that though it allows the shape of the spot to be grasped, since it fails to indicate where optical distortions are produced among the optical components including the laser oscillator, a process for identifying a site or sites of optical distortions is required and hence the proposed technology is time-consuming. According to another proposed technology, a wavefront distortion is compensated for using a wavefront sensor and a spatial light modulator (see, for example, JP 2014-236795A).

SUMMARY OF THE INVENTION

However, as the technology disclosed in JP 2014-236795A measures a processing spot without a condensing lens, the measured processing spot may possibly be different from an actual processing spot, and hence the differences between laser beams applied to workpieces on different laser processing apparatuses may not completely be compensated for.

It is therefore an object of the present invention to provide a laser processing apparatus and a method of adjusting a phase pattern which are capable of obtaining desired processed results by restraining the differences between laser beams applied to workpieces on different laser processing apparatuses.

In accordance with an aspect of the present invention, there is provided a laser processing apparatus including a chuck table for holding a workpiece thereon, a laser beam applying unit for applying a laser beam to the workpiece held on the chuck table, and a control unit. The laser beam applying unit includes a laser oscillator for oscillating a laser, a condensing lens for converging the laser beam emitted from the laser oscillator, a concave mirror positioned to have a focal point at a focused spot of the condensing lens and having a spherical reflecting surface for reflecting the laser beam, a beam splitter for transmitting therethrough the laser beam emitted from the laser oscillator toward the condensing lens and branching off a reflected beam of the laser beam converged by the condensing lens and reflected by the reflecting surface of the concave mirror, and a wavefront measuring unit for receiving the reflected beam reflected by the reflecting surface of the concave mirror and branched off by the beam splitter and acquiring wavefront data representing a spatial phase distribution of the laser beam. The control unit changes a phase pattern to be displayed on a display portion of a spatial light modulator disposed between the laser oscillator and the condensing lens on a basis of the wavefront data measured by the wavefront measuring unit.

Preferably, the concave mirror is disposed in a peripheral edge portion of the chuck table.

Preferably, the control unit includes a calculating section for approximating, by a Zernike polynomial, the wavefront data measured by the wavefront measuring unit and representing the spatial phase distribution of the laser beam and for calculating Zernike coefficients thereof, a phase pattern generating section for generating a phase pattern having predetermined Zernike coefficients and displaying the generated phase pattern on the display portion of the spatial light modulator, and a storage section for storing in advance a correlation between Zernike coefficients input to the phase pattern and Zernike coefficients of the laser beam measured by the wavefront measuring unit when the phase pattern to which the Zernike coefficients are input is displayed on the display portion of the spatial light modulator. The phase pattern generating section calculates back Zernike coefficients input to the phase pattern to be displayed on the display portion so that the Zernike coefficients of the laser beam measured by the wavefront measuring unit are desired values, on a basis of a table of the correlation stored in the storage section.

Preferably, the control unit includes a calculating section for approximating, by a Zernike polynomial, the wavefront data measured by the wavefront measuring unit and representing the spatial phase distribution of the laser beam and for calculating Zernike coefficients thereof, a phase pattern generating section for generating a phase pattern having predetermined Zernike coefficients and displaying the generated phase pattern on the display portion of the spatial light modulator, a changing section for changing an arbitrary one of the Zernike coefficients of the wavefront data measured by the wavefront measuring unit, and a determining section for determining whether or not the wavefront data measured by the wavefront measuring unit are close enough to ideal wavefront data. The laser oscillator continues to emit the laser beam, and the changing section changes an arbitrary one of the Zernike coefficients and the phase pattern generating section displays a phase pattern including the changed Zernike coefficient on the display portion of the spatial light modulator, alternately repeatedly until the determining section determines that the wavefront data measured by the wavefront measuring unit are close enough to the ideal wavefront data.

In accordance with another aspect of the present invention, there is provided a method of adjusting a phase pattern to be displayed on a display portion of a laser processing apparatus including a laser beam applying unit for applying a laser beam to a workpiece held on a chuck table. The laser beam applying unit includes a laser oscillator for oscillating a laser, a condensing lens for converging the laser beam emitted from the laser oscillator, a concave mirror positioned to have a focal point at a focused spot of the condensing lens and having a spherical reflecting surface for reflecting the laser beam, a beam splitter for transmitting therethrough the laser beam emitted from the laser oscillator toward the condensing lens and branching off a reflected beam of the laser beam converged by the condensing lens and reflected by the reflecting surface of the concave mirror, a wavefront measuring unit for receiving the reflected beam reflected by the reflecting surface of the concave mirror and branched off by the beam splitter and acquiring wavefront data representing a spatial phase distribution of the laser beam, and a spatial light modulator disposed between the laser oscillator and the condensing lens and having a display portion for adjusting optical characteristics of the laser beam emitted from the laser oscillator. The method of adjusting a phase pattern includes a Zernike coefficient input step of displaying a phase pattern having predetermined Zernike coefficients on the display portion of the spatial light modulator, a laser beam applying step of emitting the laser beam from the laser oscillator and acquiring wavefront data thereof by the wavefront measuring unit, and a Zernike coefficient adjusting step of changing an arbitrary one of the Zernike coefficients of the wavefront data measured by the wavefront measuring unit and displaying a phase pattern including the changed Zernike coefficient on the display portion of the spatial light modulator. The Zernike coefficient adjusting step is repeated until the wavefront data measured by the wavefront measuring unit are close enough to ideal wavefront data.

Preferably, the method further includes a Zernike coefficient back-calculating step of calculating back Zernike coefficients input to the phase pattern to be displayed on the display portion so that the Zernike coefficients of the laser beam measured by the wavefront measuring unit are desired values, on a basis of a table of a correlation between Zernike coefficients input to the phase pattern and Zernike coefficients of the laser beam measured by the wavefront measuring unit when the phase pattern to which the Zernike coefficients are input is displayed on the display portion of the spatial light modulator.

The present invention is advantageous in that it is capable of obtaining desired processed results by restraining the differences between laser beams applied to workpieces on different laser processing apparatuses.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Preferred embodiments of the present invention will hereinafter be described in detail with reference to the drawings. The present invention is not limited to the details of the embodiments described below. The components described below cover those which could easily be envisaged by those skilled in the art and those which are essentially identical to those described above. Further, the arrangements described below can be used in appropriate combinations. Various omissions, replacements, or changes of the arrangements may be made without departing from the scope of the present invention.

First Embodiment

Figure 1:
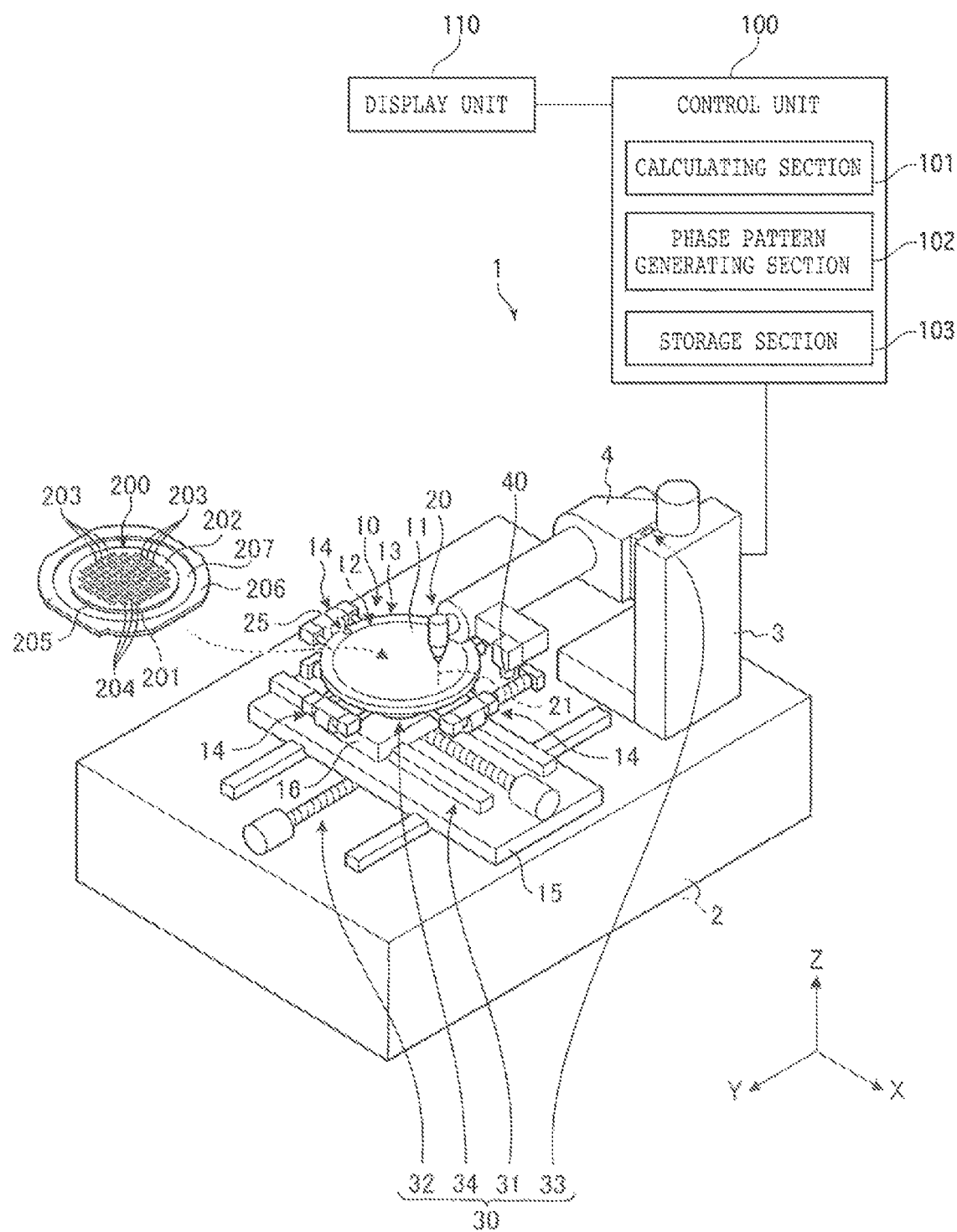
FIG. 1 is a perspective view, partly in block form, illustrating a configurational example of a laser processing apparatus according to a first embodiment of the present invention.

A laser processing apparatus according to a first embodiment of the present invention will be described below with reference to FIGS. 1 through 9. FIG. 1 illustrates in perspective, partly in block form, a configurational example of a laser processing apparatus 1 according to a first embodiment of the present invention. As illustrated in FIG. 1, the laser processing apparatus 1 according to the first embodiment is an apparatus for processing a workpiece 200 with a pulsed laser beam 21 that is applied to the workpiece 200.

The workpiece 200, which is an object to be processed by the laser processing apparatus 1 illustrated in FIG. 1, is a wafer such as a semiconductor wafer or an optical device wafer that is shaped as a circular plate and has a substrate 201 of silicon, sapphire, gallium arsenide, or the like. As illustrated in FIG. 1, the workpiece 200 has a grid of projected dicing lines 203 established on a face side 202 of the substrate 201 and a plurality of devices 204 formed in respective areas demarcated on the face side 202 by the projected dicing lines 203. The devices 204 may be circuits such as integrated circuits (ICs) or large-scale integration (LSI) circuits, or image sensors such as charge coupled devices (CCDs) or complementary metal oxide semiconductor (CMOS) image sensors.

According to the first embodiment, the workpiece 200 is disposed in an opening of an annular frame 206 and supported on an adhesive tape 207 that is of a circular shape larger in diameter than the workpiece 200 and that has an outer circumferential edge portion affixed to the annular frame 206. The adhesive tape 207 is affixed to a reverse side 205, which is opposite the face side 202, of the substrate 201. According to the first embodiment, the workpiece 200 will be divided along the projected dicing lines 203 into individual device chips including the respective devices 204.

[Laser Processing Apparatus]

As illustrated in FIG. 1, the laser processing apparatus 1 has a chuck table 10 for holding the workpiece 200 on a holding surface 11 thereof, a laser beam applying unit 20, a moving assembly 30, an image capturing unit 40, and a control unit 100.

The chuck table 10 holds the workpiece 200 on the holding surface 11 thereof. The chuck table 10 is of a disk shape including a disk-shaped suction portion 12 having a flat upper surface as the holding surface 11 for holding the workpiece 200 thereon and made of porous ceramic or the like having a number of pores, and a frame body 13 having an upper central recess defined therein with the suction portion 12 fixedly fitted therein. The frame body 13 has an upper surface lying flush with the holding surface 11. According to the first embodiment, the frame body 13 acts as a peripheral edge portion of the chuck table 10. The suction portion 12 is connected to a vacuum suction source, not illustrated, through a vacuum suction channel, not illustrated. When the vacuum suction source is actuated, the vacuum suction source generates a negative pressure acting on the holding surface 11, causing the chuck table 10 to hold the workpiece 200 under suction that is placed on the holding surface 11. According to the first embodiment, the holding surface 11 is a flat surface lying parallel to horizontal directions. A plurality of clamps 14 are disposed around the chuck table 10 for gripping the annular frame 206 with the workpiece 200 supported in its opening.

The chuck table 10 is rotatable about a central axis parallel to Z-axis directions by a rotating unit 34 of the moving assembly 30. The Z-axis directions are perpendicular to the holding surface 11 and parallel to vertical directions. The chuck table 10 and the rotating unit 34 are movable in X-axis directions parallel to horizontal directions by an X-axis moving unit 31 of the moving assembly 30 and also movable in Y-axis directions parallel to horizontal directions and perpendicular to the X-axis directions by a Y-axis moving unit 32 of the moving assembly 30.

The laser beam applying unit 20 applies the pulsed laser beam 21 having a wavelength transmittable through the workpiece 200 to the workpiece 200 held on the chuck table 10 to form modified layers acting as rupture initiating points within the workpiece 200. The modified layers refer to regions whose density, refractive index, mechanical strength, and other physical properties are different from those of surrounding regions. For example, the modified layers include melted regions, cracked regions, dielectric-breakdown regions, altered-refractive-index regions, or regions where those regions coexist. According to the first embodiment, the modified layers are lower in mechanical strength than the other regions in the substrate 201.

According to the first embodiment, the laser beam applying unit 20 applies the pulsed laser beam 21 whose wavelength is transmittable through the workpiece 200 to the workpiece 200. According to the present invention, however, the laser beam applying unit 200 may apply a pulsed laser beam 21 having a wavelength absorbable by the workpiece 200 to the workpiece 200 to ablate the workpiece 200. According to the first embodiment, as illustrated in FIG. 1, the laser beam applying unit 20 includes some components supported on a vertically movable member 4 that is movable in the Z-axis directions by a Z-axis moving unit 33 of the moving assembly 30 that is mounted on an upstanding wall 3 erected from an apparatus body 2 of the laser processing apparatus 1. Structural and operational details of the laser beam applying unit 20 will be described later.

The moving assembly 30 moves the chuck table 10 and the laser beam applying unit 20 relatively to each other in the X-axis directions, the Y-axis directions, and the Z-axis directions. The X-axis directions and the Y-axis directions extend parallel to the holding surface 11. The moving assembly 30 includes the X-axis moving unit 31 as processing feed means for moving the chuck table 10 in the X-axis directions, the Y-axis moving unit 32 as indexing feed means for moving the chuck table 10 in the Y-axis directions, the Z-axis moving unit 33 for moving the laser beam applying unit 20 in the Z-axis directions, and the rotating unit 34 for rotating the chuck table 10 about the central axis parallel to the Z-axis directions.

According to the first embodiment, the Y-axis moving unit 32 is mounted on the apparatus body 2 of the laser processing apparatus 1. The X-axis moving unit 31 is supported on a movable plate 15 that is movably mounted on the Y-axis moving unit 32 for movement in the Y-axis directions. The rotating unit 34 that rotates the chuck table 10 about the central axis parallel to the Z-axis directions is supported on a second movable plate 16 that is movably mounted on the X-axis moving unit 31 for movement in the X-axis directions. The Z-axis moving unit 33 is mounted on the upstanding wall 3 and supports thereon the vertically movable member 4 for movement in the Z-axis directions.

The X-axis moving unit 31, the Y-axis moving unit 32, and the Z-axis moving unit 33 include respective known ball screws rotatable about their central axes, respective known stepping motors for rotating the ball screws about their central axes, and respective pairs of known guide rails on which the movable plates 15 and 16 are movably supported for movement in the X-axis directions and the Y-axis directions and the vertically movable member 4 are movably supported for movement in the Z-axis directions.

The laser processing apparatus 1 further includes an X-axis position detecting unit, not illustrated, for detecting the position of the chuck table 10 in the X-axis directions, a Y-axis position detecting unit, not illustrated, for detecting the position of the chuck table 10 in the Y-axis directions, and a Z-axis position detecting unit, not illustrated, for detecting the position of the laser beam applying unit 20 in the Z-axis directions. Each of the position detecting units outputs its detected result to the control unit 100.

The image capturing unit 40 captures an image of the workpiece 200 held on the chuck table 10. The image capturing unit 40 includes an image capturing device such as a CCD image capturing device or a CMOS image capturing device. According to the first embodiment, the image capturing unit 40 is mounted on a distal end of a casing of the laser beam applying unit 20 at a position alongside of a condensing lens 23, illustrated in FIG. 2, of the laser beam applying unit 20 in the X-axis directions. The image capturing unit 40 captures an image of the workpiece 200 for use in an alignment process for positioning the workpiece 200 and the laser beam applying unit 20 in alignment with each other, and outputs the captured images to the control unit 100.

The control unit 100 controls the above components of the laser processing apparatus 1 to cause the laser processing apparatus 1 to process the workpiece 200. The control unit 100 is a computer having an arithmetic processing apparatus having a microprocessor such as a central processing unit (CPU), a storage apparatus having a memory such as a read only memory (ROM) or a random access memory (RAM), and an input/output interface apparatus. The arithmetic processing apparatus of the control unit 100 performs arithmetic processing operations according to computer programs stored in the storage apparatus and outputs control signals for controlling the laser processing apparatus 1 through the input/output interface apparatus to the components, referred to above, of the laser processing apparatus 1, thereby performing the functions of the control unit 100.

The laser processing apparatus 1 further includes a display unit 110 constructed as a liquid crystal display apparatus for displaying states and images of processing operations, and an input unit, not illustrated, to be used for an operator to register processing content information, etc. The display unit 110 and the input unit are electrically connected to the control unit 100. The input unit includes at least one of a touch panel incorporated in the display unit 110 and an external input apparatus such as a keyboard.

Figure 2:
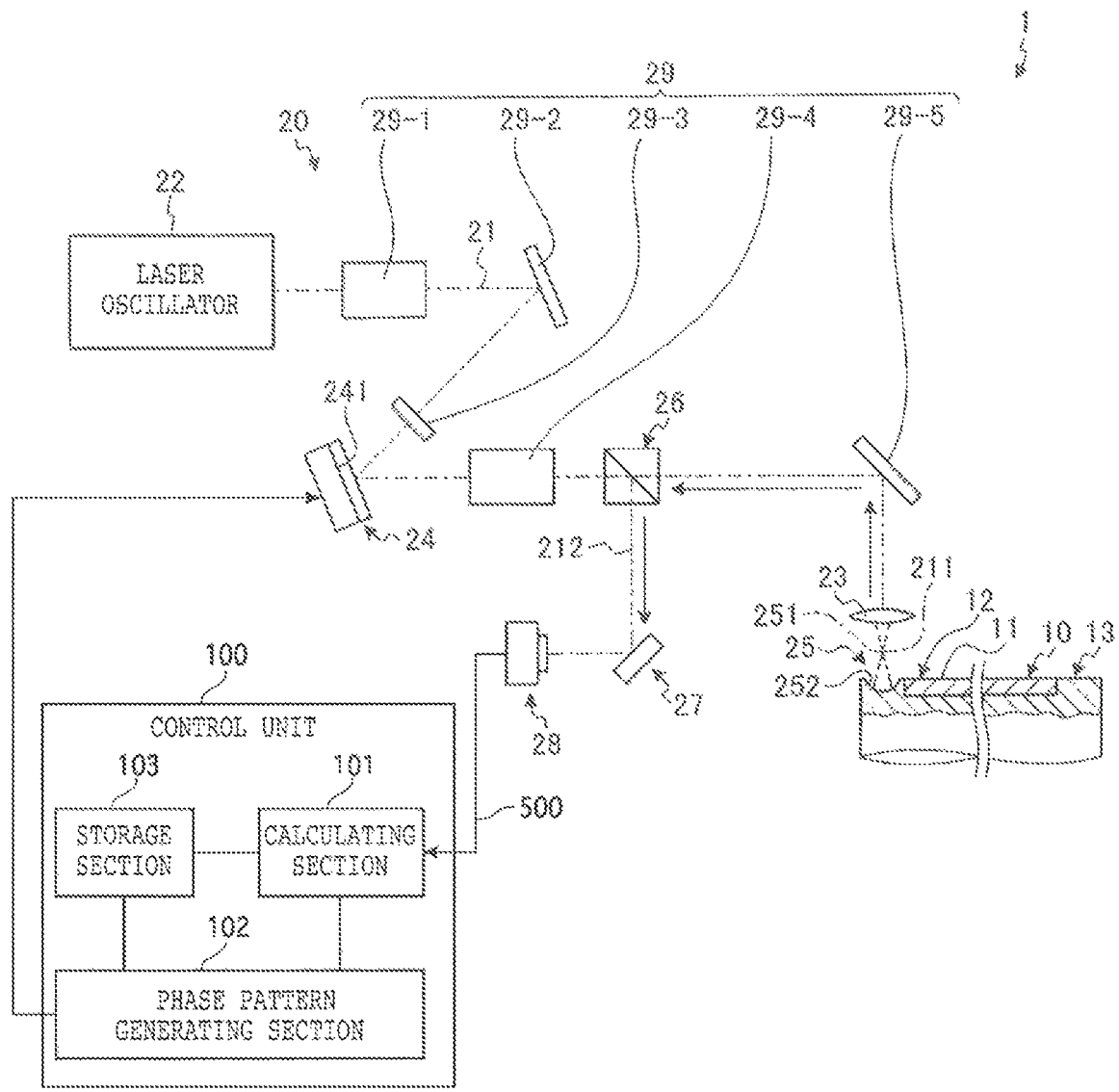
FIG. 2 is a schematic view, partly in block form, illustrating a configuration of a laser beam applying unit of the laser processing apparatus illustrated in FIG. 1.

The laser beam applying unit 20 will be described below. FIG. 2 schematically illustrates, partly in block form, the configuration of the laser beam applying unit 20 of the laser processing apparatus 1 illustrated in FIG. 1. As illustrated in FIG. 2, the laser beam applying unit 20 includes a laser oscillator 22 for oscillating a laser for processing the workpiece 200, a condensing lens 23 for converging a laser beam 21 emitted from the laser oscillator 22 onto the workpiece 200 held on the holding surface 11 of the chuck table 10, a spatial light modulator 24, a concave mirror 25, a beam splitter 26 as branching means, attenuating means 27, a wavefront measuring unit 28, and a plurality of optical parts 29.

The condensing lens 23 is disposed in a position facing the holding surface 11 of the chuck table 10 in the Z-axis directions. The condensing lens 23 transmits the laser beam 21 emitted from the laser oscillator 22 therethrough and focuses the laser beam 21 onto a focused spot 211 thereof.

The spatial light modulator 24 is a liquid crystal on silicon-spatial light modulator (LCOS-SLM) disposed on an optical path of the laser beam 21 between the laser oscillator 22 and the condensing lens 23. The spatial light modulator 24 adjusts optical characteristics of the laser beam 21 emitted from the laser oscillator 22 and outputs the laser beam 21 with the adjusted optical characteristics. According to the first embodiment, the spatial light modulator 24 is a modulator for reflecting the laser beam 21 emitted from the laser oscillator 22. According to the first embodiment, the optical characteristics of the laser beam 21 that are adjusted by the spatial light modulator 24 are at least one of phase, plane of polarization, amplitude, intensity, and direction of propagation of the laser beam 21.

According to the first embodiment, the spatial light modulator 24 includes a display portion 241 that is irradiated with the laser beam 21 emitted from the laser oscillator 22 and adjusts the optical characteristics of the laser beam 21 when the spatial light modulator 24 reflects the laser beam 21. The spatial light modulator 24 emits the laser beam 21 with the optical characteristics adjusted by the display portion 241 through the beam splitter 26, etc., toward the condensing lens 23. According to the first embodiment, the display portion 241 of the spatial light modulator 24 displays a phase pattern for adjusting the optical characteristics of the laser beam 21, and reflects the laser beam 21 to adjust the optical characteristics of the laser beam 21. The phase pattern is controlled by the control unit 100. The spatial light modulator 24 adjusts the optical characteristics of the laser beam 21 to be emitted therefrom when the phase pattern displayed on the display portion 214 is controlled by the control unit 100.

The concave mirror 25 is disposed in a position capable of facing the condensing lens 23 in the Z-axis directions. The concave mirror 25 has a reflecting surface 252 which, when the concave mirror 25 faces the condensing lens 23 in the Z-axis directions, has its focal point 251 positioned at the focused spot 211 of the condensing lens 23. According to the first embodiment, the concave mirror 25 is disposed in the frame body 13 of the chuck table 10 in a position where the reflecting surface 252 can face the condensing lens 23 in the Z-axis directions. According to the first embodiment, the focal point 251 of the reflecting surface 252 is positioned at the focused spot 211 of the condensing lens 23 when the position of the condensing lens 23 in the Z-axis directions is adjusted by the Z-axis moving unit 33 to position the focused spot 211 of the condensing lens 23 at the focal point 251. The reflecting surface 252 is a spherical surface that reflects the laser beam 21 from the condensing lens 23 back to the condensing lens 23 that the reflecting surface 252 faces.

The beam splitter 26 passes therethrough the laser beam 21 emitted from the laser oscillator 22 and has its optical characteristics adjusted by the spatial light modulator 24 to the condensing lens 23. The beam splitter 26 also reflects a reflected beam 212 of the laser beam 21 that has been converged by the condensing lens 23, reflected by the reflecting surface 252 of the concave mirror 25, and transmitted through the condensing lens 23 toward the attenuating means 27, thereby branching the reflected beam 212 off from the laser beam 21.

The attenuating means 27 attenuates the intensity of the reflected beam 212 reflected by the beam splitter 26. According to the first embodiment, the attenuating means 27 reflects the reflected beam 212 whose intensity has been attenuated toward the wavefront measuring unit 28. The attenuating means 27 may be constructed as a wedged substrate, for example.

The wavefront measuring unit 28 receives the reflected beam 212 that has been reflected by the reflecting surface 252 of the concave mirror 25, branched off from the laser beam 21 by the beam splitter 26, and attenuated in intensity by the attenuating means 27, and measures and acquires wavefront information 500 (see FIG. 2, hereinafter referred to as "wavefront data 500") representing a spatial phase distribution of the laser beam 21. The wavefront measuring unit 28 is what is called a wavefront sensor for measuring, as the wavefront data 500, a wavefront configuration or an intensity distribution of the reflected beam 212 of the laser beam 21, particularly aberrations of the wavefront of the reflected beam 212 of the laser beam 21. The wavefront measuring unit 28 outputs the measured wavefront data 500 of the reflected beam 212 of the laser beam 21 to the control unit 100.

The optical parts 29 act to propagate the laser beam 21 emitted from the laser oscillator 22 to a processing point where the workpiece 200 is processed or the concave mirror 25, and also to propagate the reflected beam 212 of the laser beam 21 reflected by the reflecting surface 252 of the concave mirror 25 to the wavefront measuring unit 28. According to the first embodiment, the optical parts 29 include a beam expander 29-1, a reflecting mirror 29-2, and a wave plate 29-3 that are disposed in an optical path of the laser beam 21 between the laser oscillator 22 and the spatial light modulator 24. According to the first embodiment, the beam expander 29-1, the reflecting mirror 29-2, and the wave plate 29-3 are successively disposed in the order named from the laser oscillator 22 toward the spatial light modulator 24. The optical parts 29 also include a relay optical system 29-4 disposed in an optical path of the laser beam 21 between the spatial light modulator 24 and the beam splitter 26 and a reflecting mirror 29-5 disposed in an optical path of the laser beam 21 between the beam splitter 26 and the condensing lens 23.

Figure 3:
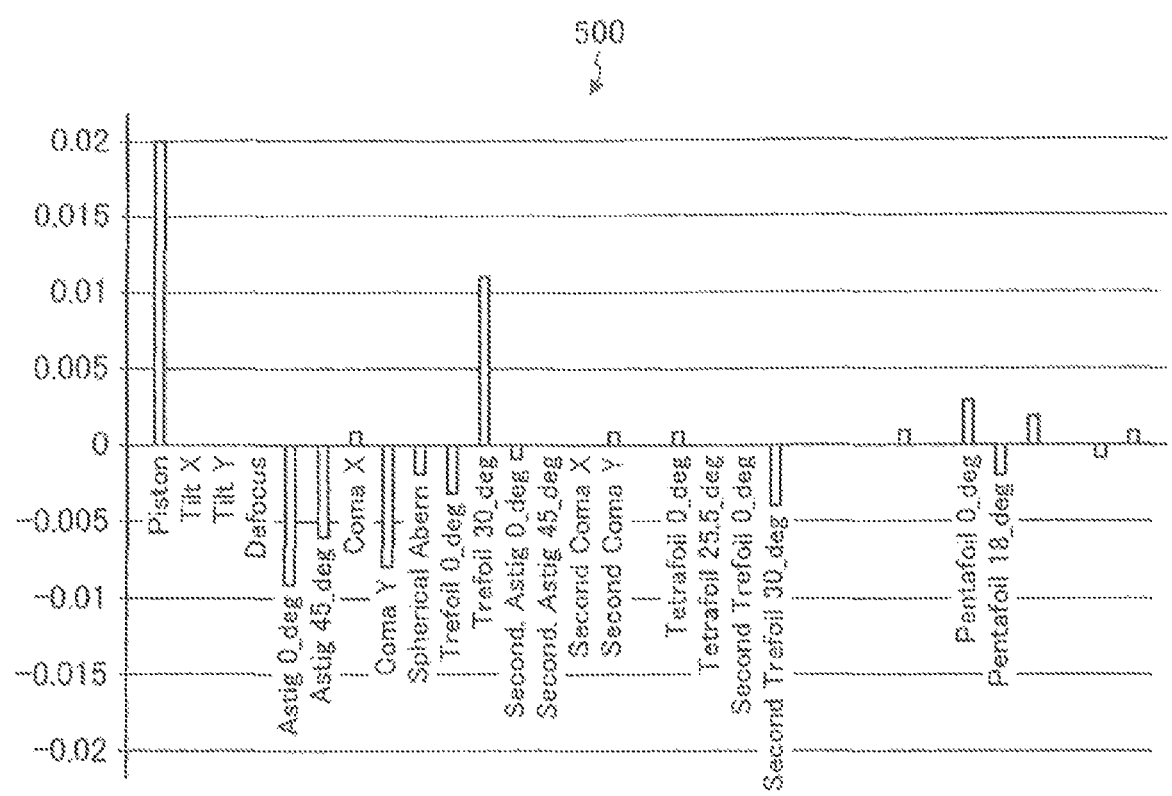
FIG. 3 is a diagram illustrating an example of Zernike coefficients of a reflected beam from a laser beam measured by a wavefront measuring unit, which are calculated by a calculating section of the laser processing apparatus illustrated in FIG. 1.
Figure 4:
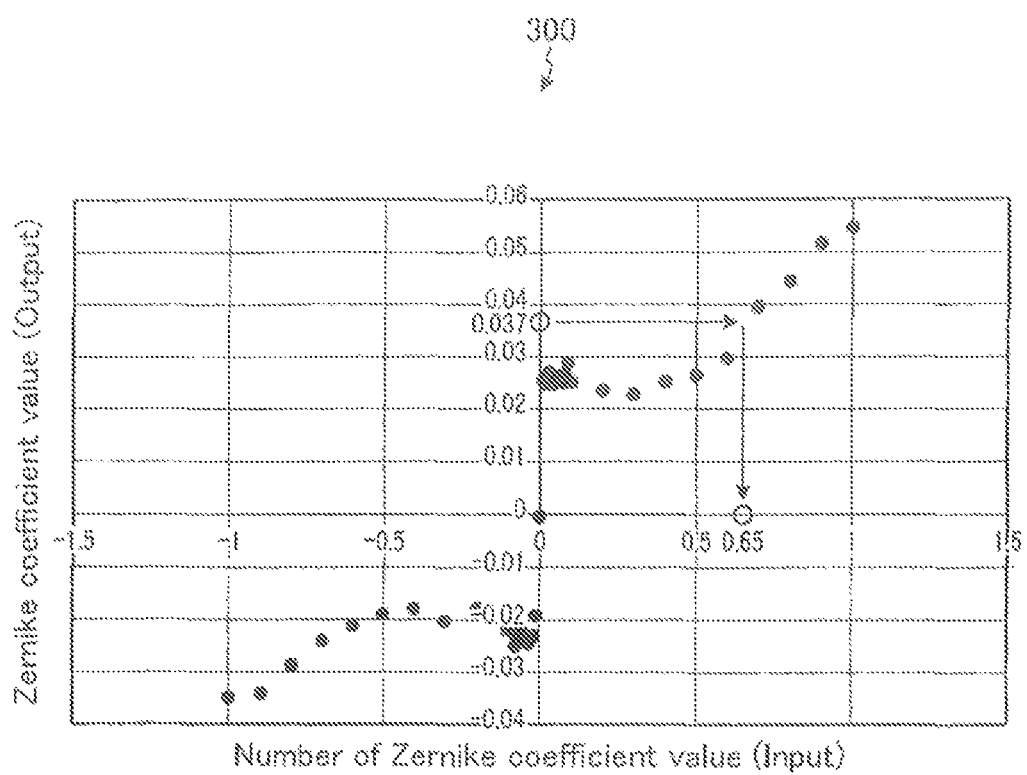
FIG. 4 is a diagram illustrating an example of a correlation stored in a storage unit of the laser processing apparatus illustrated in FIG. 1.

As illustrated in FIG. 1, the control unit 100 of the laser processing apparatus 1 according to the first embodiment includes a calculating section 101, a phase pattern generating section 102, and a storage section 103. These components of the control unit 100 will be described below. FIG. 3 illustrates an example of Zernike coefficients of the reflected beam 212 of the laser beam 21 measured by the wavefront measuring unit 28, which are calculated by the calculating section 101 of the laser processing apparatus 1 illustrated in FIG. 1. FIG. 4 illustrates an example of a correlation stored in the storage section 103 of the laser processing apparatus 1 illustrated in FIG. 1.

The calculating section 101 approximates, by a Zernike polynomial, the wavefront data 500 of the reflected beam 212 of the laser beam 21 measured by the wavefront measuring unit 28 and calculates Zernike coefficients thereof. The Zernike polynomial refers to an orthogonal polynomial defined on a unit circle. The Zernike coefficients are values calculated according to the Zernike polynomial that approximates the wavefront data 500 of the reflected beam 212 of the laser beam 21, and are in a one-to-one correspondence to the aberrations of the optical system of the laser beam applying unit 20. The calculating section 101 approximates, by a Zernike polynomial, the wavefront data 500 of the reflected beam 212 of the laser beam 21 measured by the wavefront measuring unit 28 and calculates Zernike coefficients illustrated in FIG. 3 according to the Zernike polynomial that has approximated the wavefront data 500, thereby expressing the Zernike coefficients as numerical values. The horizontal axis of FIG. 3 represents the Zernike coefficients and the vertical axis thereof represents the values of the Zernike coefficients. In FIG. 3, the Zernike coefficients "Astig 0_deg" and "Astig 45_deg" correspond to astigmatism, the Zernike coefficients "Coma X" and "Coma Y" to coma, and the Zernike coefficient "Spherical Abern" to spherical aberration.

The storage section 103 stores in advance a correlation 300 illustrated in FIG. 4. The correlation 300 illustrated in FIG. 4 represents a correlation between the values of a Zernike coefficient input to a phase pattern to be displayed on the display portion 241 of the spatial light modulator 24 and the values of the Zernike coefficient calculated by the calculating section 101 from the wavefront data 500 of the reflected beam 212 of the laser beam 21 measured by the wavefront measuring unit 28 when the phase pattern to which the Zernike coefficients are input is displayed on the display portion 241 of the spatial light modulator 24. The horizontal axis of FIG. 4 represents the values of the Zernike coefficient input to the phase pattern to be displayed on the display portion 241 of the spatial light modulator 24, and the vertical axis of FIG. 4 represents the values of the Zernike coefficient calculated by the calculating section 101 from the wavefront data 500 of the reflected beam 212 of the laser beam 21 measured by the wavefront measuring unit 28 when the phase pattern to which the Zernike coefficients are input is displayed on the display portion 241 of the spatial light modulator 24.

The storage section 103 stores correlations 300, one of which is illustrated in FIG. 4, with respect to the respective Zernike coefficients, i.e., the respective aberrations. In other words, the storage section 103 stores as many correlations 300, one of which is illustrated in FIG. 4 by way of example, as the number of the Zernike coefficients calculated according to the Zernike polynomial, i.e., the number of the aberrations of the optical system. The correlation 300 illustrated in FIG. 4 corresponds to astigmatism 0°. The correlation 300 is determined and stored in the storage section 103 in advance as follows: The display portion 241 of the spatial light modulator 24 displays a phase pattern to which predetermined values are input as respective Zernike coefficients, and the laser oscillator 22 emits the laser beam 21. The calculating section 101 calculates the values of Zernike coefficients from the wavefront data 500 of the reflected beam 212 of the laser beam 21 measured by the wavefront measuring unit 28. The values of the Zernike coefficients of the phase pattern displayed on the display portion 241, represented by the horizontal axis of FIG. 4, and the values of the Zernike coefficients calculated by the calculating section 101 from the wavefront data 500 acquired by the wavefront measuring unit 28, represented by the vertical axis of FIG. 4, are determined and correlated to each other, and stored in the storage section 103. According to the first embodiment, the storage section 103 stores the correlations 300 with respect to the respective Zernike coefficients, i.e., the respective aberrations. However, in a case where not all the aberrations need to be adjusted using the correlations 300, e.g., in a case where only the astigmatism 0° needs to be corrected, the storage section 103 may store only the correlation 300 corresponding to the astigmatism 0°. Stated otherwise, according to the present invention, the storage section 103 may store only the correlation 300 that corresponds to an aberration to be adjusted using the correlation 300, and may not necessarily store as many correlations 300 as the number of all the aberrations.

The phase pattern generating section 102 generates a phase pattern having Zernike coefficients that are of predetermined values input from the input unit and displays the generated phase pattern on the display portion 241 of the spatial light modulator 24. Specifically, the phase pattern generating section 102 accepts the values of the Zernike coefficients input from the input unit, and when the phase pattern generating section 102 accepts the values of all the Zernike coefficients, the phase pattern generating section 102 generates a phase pattern having the Zernike coefficients that are of the accepted values. Then, the phase pattern generating section 102 displays the generated phase pattern on the display portion 241.

Further, when the operator operates the input unit to change the value of either one of the Zernike coefficients, the phase pattern generating section 102 accepts the changed value of the Zernike coefficient, generates a phase pattern including the Zernike coefficient of the changed value, and displays the phase pattern on the display portion 241. The phase pattern generating section 102 also calculates back Zernike coefficients input to a phase pattern to be displayed on the display portion 241 so that the Zernike coefficients of the reflected beam 212 of the laser beam 21 measured by the wavefront measuring unit 28 are desired values, on the basis of the table of the correlation 300 stored in the storage section 103 as illustrated in FIG. 4 by way of example. Moreover, the phase pattern generating section 102 generates a phase pattern having the Zernike coefficients thus calculated back and changes the phase pattern displayed on the display portion 241 to the generated phase pattern.

The function of the storage section 103 is realized by the storage apparatus. The functions of the calculating section 101 and the phase pattern generating section 102 are realized by the arithmetic processing apparatus as the arithmetic processing apparatus performs arithmetic processing operations according to computer programs stored in the storage apparatus.

When the operator registers processing content information in the control unit 100 and places the workpiece 200 on the holding surface 11 of the chuck table 10 with the adhesive tape 207 interposed therebetween and the control unit 100 receives a processing operation start instruction of the operator from the input unit, the laser processing apparatus 1 starts to perform a processing operation based on the registered processing content information.

In the processing operation by the laser processing apparatus 1, the workpiece 200 is held under suction on the holding surface 11 of the chuck table 10 with the adhesive tape 207 interposed therebetween, and the annular frame 206 is gripped in position by the clamps 14. Next, the moving assembly 30 moves the chuck table 10 to a position below the image capturing unit 40, and then, the image capturing unit 40 captures an image of the workpiece 200. The laser processing apparatus 1 performs an alignment process on the basis of the image captured by the image capturing unit 40.

On the basis of the registered processing content information, the moving assembly 30 moves the laser beam applying unit 20 and the workpiece 200 relatively to each other along one of the projected dicing lines 203, during which time the laser beam applying unit 20 applies the laser beam 21 to the workpiece 200 along the projected dicing line 203, forming modified layers in the substrate 201 along the projected dicing line 203, according to the first embodiment. When the laser beam applying unit 20 has formed modified layers in the substrate 201 along all the projected dicing lines 203, the laser beam applying unit 20 stops applying the laser beam 21, whereupon the laser processing apparatus 1 finishes the processing operation.

Figure 5:
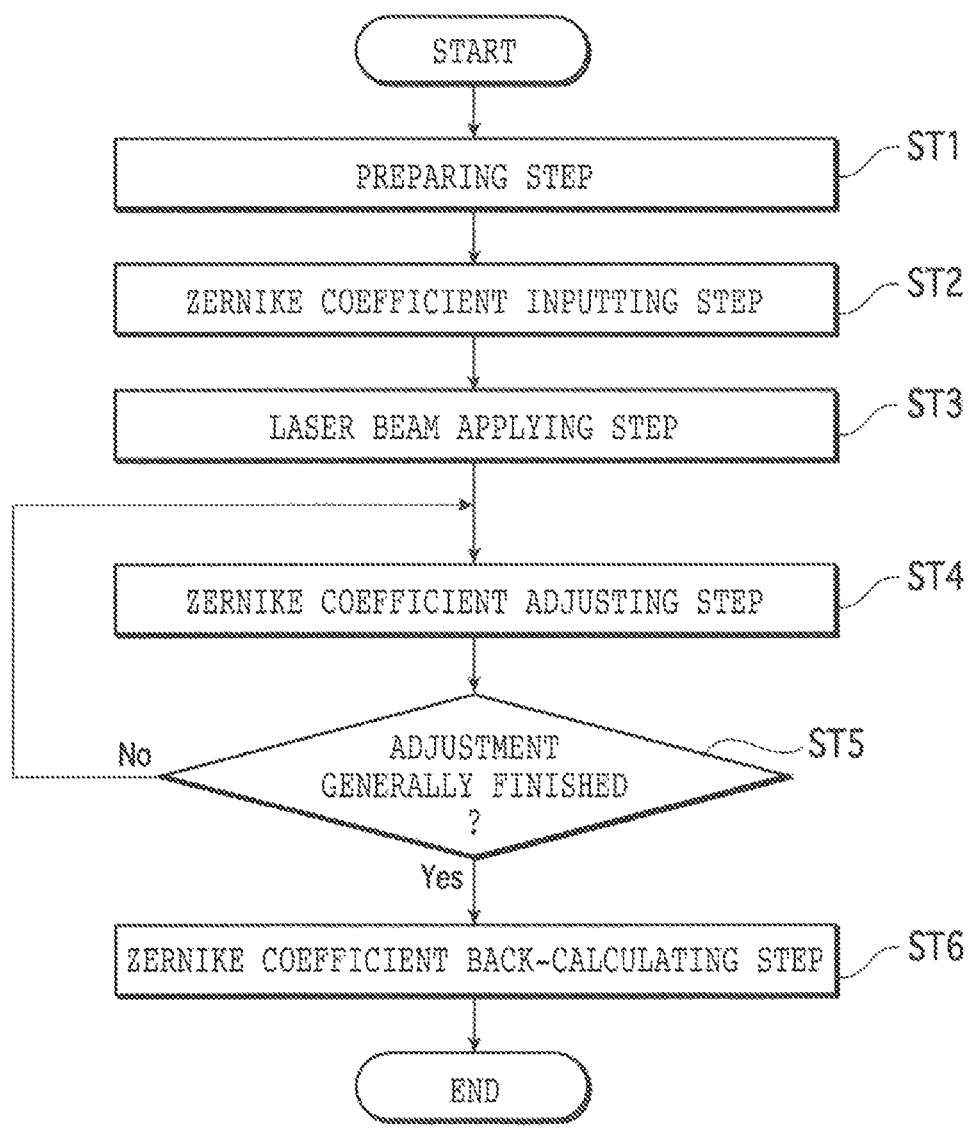
FIG. 5 is a flowchart of a sequence of a method of adjusting a phase pattern that is carried out by the laser processing apparatus illustrated in FIG. 1.
Figure 6:
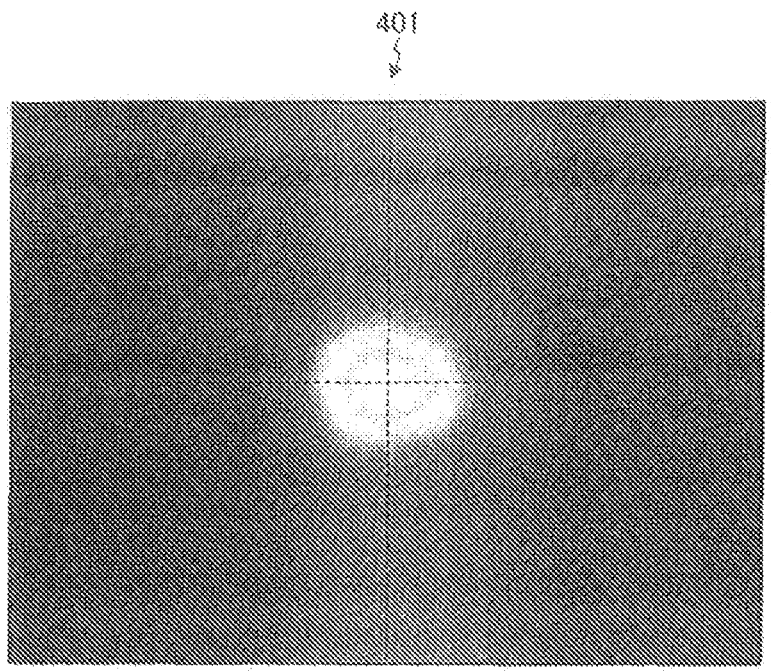
FIG. 6 is a diagram illustrating an example of a beam profile of a reflected beam of a laser beam at a time a phase pattern having Zernike coefficients of predetermined values is displayed on a display portion by the wavefront measuring unit of the laser processing apparatus illustrated in FIG. 1.
Figure 7:
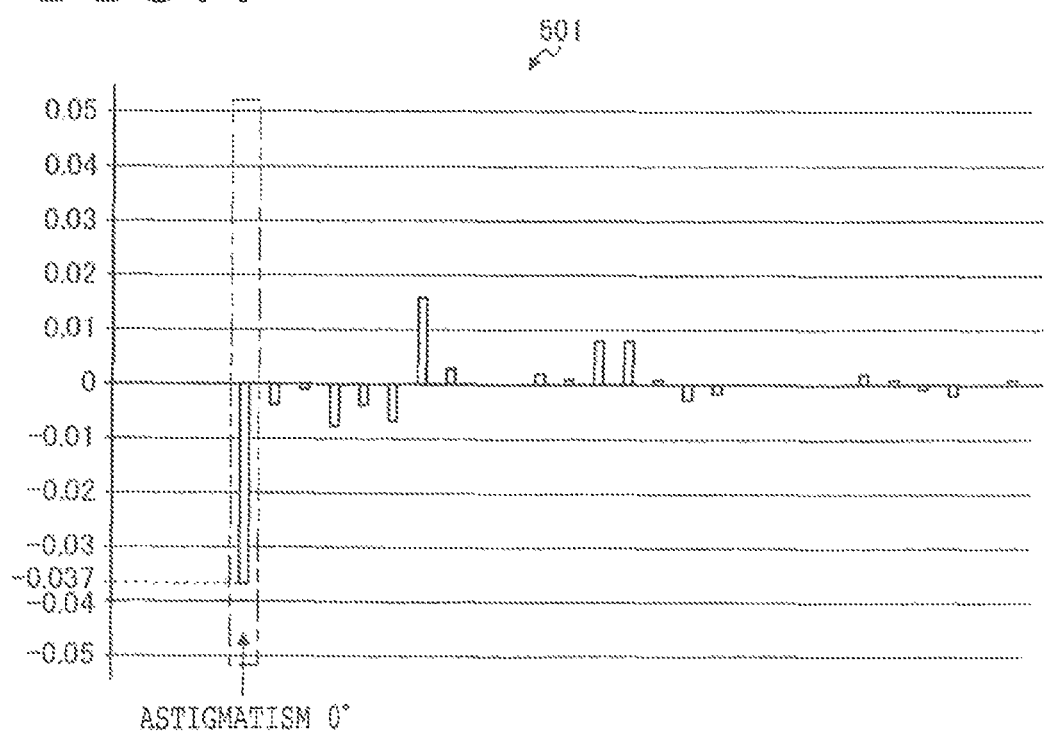
FIG. 7 is a diagram illustrating an example of the values of the Zernike coefficients as wavefront data of the reflected beam of the laser beam illustrated in FIG. 6.
Figure 8:
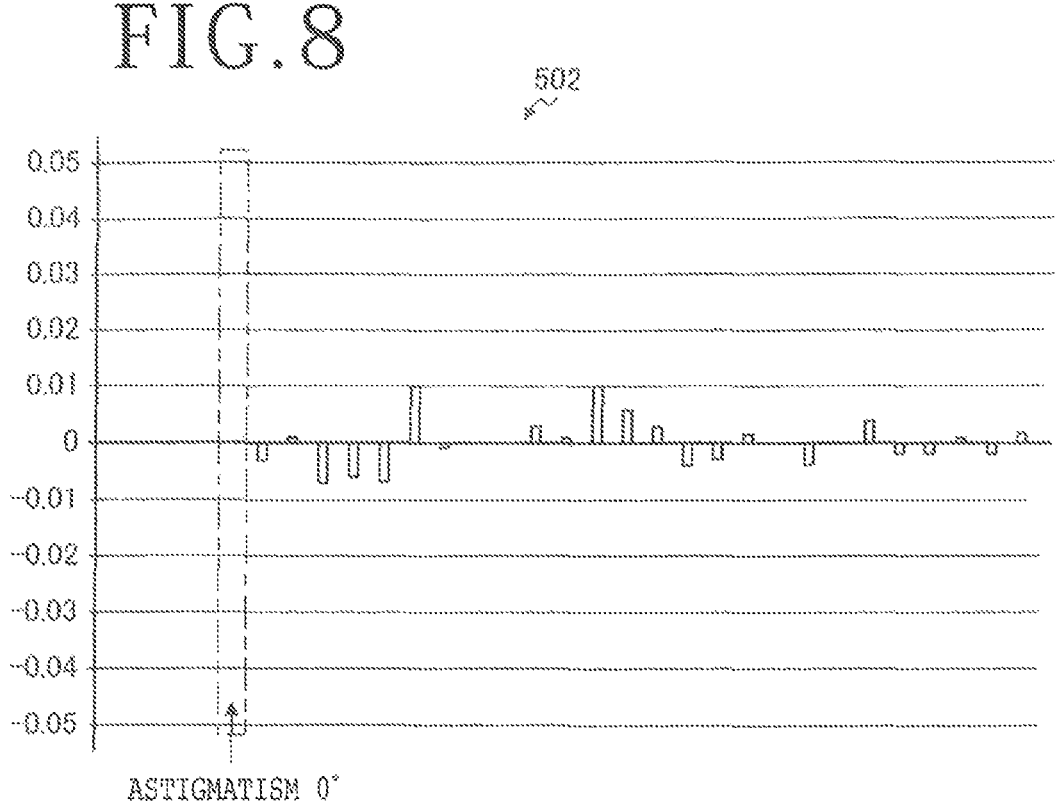
FIG. 8 is a diagram illustrating an example of the values of the Zernike coefficients as wavefront data of the reflected beam of the laser beam, which are changed from the values illustrated in FIG. 7 by a phase pattern generating section of the laser processing apparatus illustrated in FIG. 1.

The laser processing apparatus 1 carries out a method of adjusting a phase pattern, as described below, before starting the processing operation. The method of adjusting a phase pattern will be described below. FIG. 5 illustrates a flowchart of a sequence of the method of adjusting a phase pattern that is carried out by the laser processing apparatus 1 illustrated in FIG. 1. FIG. 6 illustrates an example of a beam profile of the reflected beam 212 of the laser beam 21 at a time a phase pattern having Zernike coefficients of predetermined values is displayed on the display portion 241 by the wavefront measuring unit 28 of the laser processing apparatus 1 illustrated in FIG. 1. FIG. 7 illustrates an example of the values of the Zernike coefficients as wavefront data of the reflected beam 212 of the laser beam 21 illustrated in FIG. 6. FIG. 8 illustrates an example of the values of the Zernike coefficients as wavefront data of the reflected beam 212 from the laser beam 21, which are changed from the values illustrated in FIG. 7 by the phase pattern generating section 102 of the laser processing apparatus 1 illustrated in FIG. 1.

Figure 9:
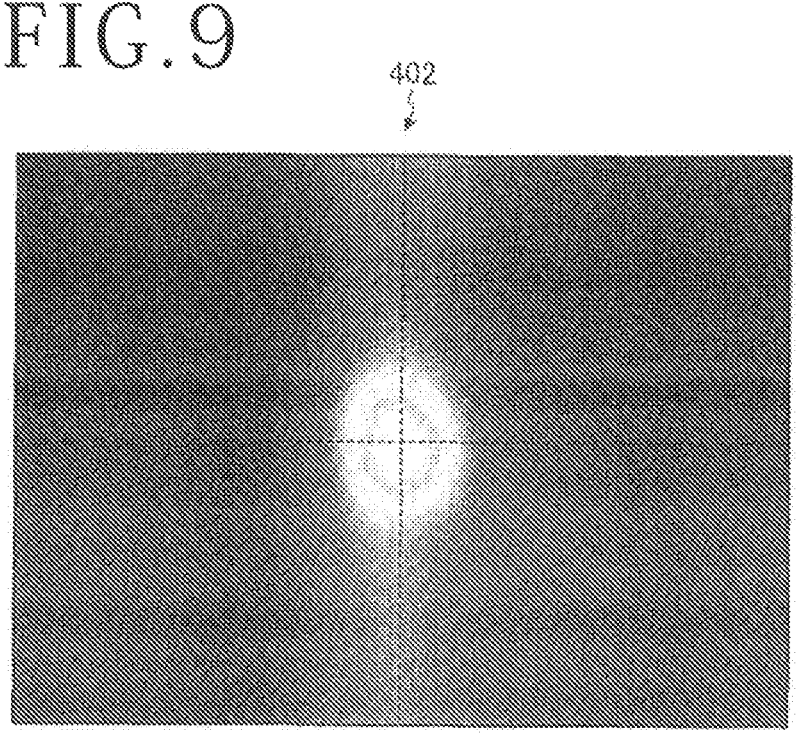
FIG. 9 is a diagram illustrating an example of a beam profile of a reflected beam from a laser beam at a time a phase pattern having Zernike coefficients of the values illustrated in FIG. 8 is displayed on the display portion.

FIG. 9 illustrates an example of a beam profile of a reflected beam of a laser beam at a time a phase pattern having Zernike coefficients of the values illustrated in FIG. 8 is displayed on the display portion 241.

The method of adjusting a phase pattern is a method of adjusting a phase pattern to be displayed on the display portion 241 of the spatial light modulator 24 to an ideal phase pattern that makes it possible to apply the laser beam 21 in a manner to obtain ideal processing results at a processing spot during a processing operation by bringing the wavefront data 500 of the laser beam 21 measured by the wavefront measuring unit 28 to ideal wavefront data 502 illustrated in FIG. 8. The ideal wavefront data 502 refer to wavefront data acquired when the wavefront measuring unit 28 receives the laser beam 21 that obtains ideal processing results at a processing spot during a processing operation. The values of the Zernike coefficients of the ideal wavefront data 502 represent desired values of the respective Zernike coefficients. As illustrated in FIG. 5, the method of adjusting a phase pattern includes preparing step ST1, Zernike coefficient inputting step ST2, laser beam applying step ST3, Zernike coefficient adjusting step ST4, and Zernike coefficient back-calculating step ST6.

Preparing step ST1 is a step of storing the values of the Zernike coefficients of ideal wavefront data 502 in the storage section 103 and placing the condensing lens 23 of the laser beam applying unit 20 and the reflecting surface 252 of the concave mirror 25 into facing relation to each other. According to the first embodiment, in preparing step ST1, the control unit 100 controls the X-axis moving unit 31 and the Y-axis moving unit 32 to place the condensing lens 23 of the laser beam applying unit 20 and the reflecting surface 252 of the concave mirror 25 into facing relation to each other in the Z-axis directions, and controls the Z-axis moving unit 33 to position the focused spot 211 of the condensing lens 23 at the focal point 251 of the reflecting surface 252.

In preparing step ST1, the control unit 100 also responds to an operator's action on the input unit to store the values of the Zernike coefficients of the ideal wavefront data 502 in the storage section 103.

Zernike coefficient inputting step ST2 is a step of inputting Zernike coefficients of predetermined values and displaying a phase pattern having the input Zernike coefficients of the predetermined values on the display portion 241. In Zernike coefficient inputting step ST2, the control unit 100 stores Zernike coefficients of predetermined values in response to an operator's action on the input unit. According to the first embodiment, the predetermined values refer to arbitrary values. In Zernike coefficient inputting step ST2, when the phase pattern generating section 102 receives the values of all the Zernike coefficients, the phase pattern generating section 102 generates a phase pattern having the Zernike coefficients of the received values. In Zernike coefficient inputting step ST2, the phase pattern generating section 102 displays the generated phase pattern on the display portion 241.

Laser beam applying step ST3 is a step of emitting the laser beam 21 from the laser oscillator 22, applying the laser beam 21 whose optical characteristics have been adjusted by the phase pattern having the Zernike coefficients of the predetermined values input in Zernike coefficient inputting step ST2 to the reflecting surface 252 of the concave mirror 25, and acquiring the wavefront data 500 from the wavefront measuring unit 28. In laser beam applying step ST3, while the phase pattern generating section 102 is displaying the phase pattern generated in Zernike coefficient inputting step ST2, the laser oscillator 22 emits the laser beam 21, and the laser beam 21 emitted from the laser oscillator 22 is applied through the spatial light modulator 24, the beam splitter 26, and the condensing lens 23, etc., to the reflecting surface 252 of the concave mirror 25. The optical characteristics of the laser beam 21 applied to the reflecting surface 252 have been adjusted according to the phase pattern generated by the phase pattern generating section 102 and displayed on the display portion 241.

In laser beam applying step ST3, the reflected beam 212 of the laser beam 21 that is reflected by the reflecting surface 252 is reflected by the beam splitter 26 toward the attenuating means 27, which reflects the reflected beam 212 from the beam splitter 26 toward the wavefront measuring unit 28. In laser beam applying step ST3, the wavefront measuring unit 28 receives the reflected beam 212 of the laser beam 21, acquires wavefront data 500 of the reflected beam 212, and outputs the acquired wavefront data 500 to the control unit 100. In laser beam applying step ST3, the calculating section 101 of the control unit 100 approximates, by a Zernike polynomial, the wavefront data 500 acquired by the wavefront measuring unit 28, calculates the values of respective Zernike coefficients as numerical values, and displays the wavefront data 500 illustrated in FIG. 3 on the display unit 110. The laser oscillator 22 subsequently emits the laser beam 21 at a predetermined repetitive frequency until the method of adjusting a phase pattern is finished.

Zernike coefficient adjusting step ST4 is a step of changing the value of an arbitrary one of the Zernike coefficients of the wavefront data 500 acquired by the wavefront measuring unit 28 and displaying a phase pattern having Zernike coefficients of values including the changed value on the display portion 241. In Zernike coefficient adjusting step ST4, the operator confirms the wavefront data 500 displayed on the display unit 110, operates the input unit to change an arbitrary one of the Zernike coefficients of the wavefront data 500, and inputs the changed value. In Zernike coefficient adjusting step ST4, when the phase pattern generating section 102 of the control unit 100 receives the changed value of the Zernike coefficient, the phase pattern generating section 102 generates a phase pattern having Zernike coefficients of values including the changed value and displays the generated phase pattern on the display portion 241.

In Zernike coefficient adjusting step ST4, the wavefront measuring unit 28 receives the reflected beam 212 of the laser beam 21 whose optical characteristics have been adjusted by the phase pattern having the Zernike coefficients of values including the changed value and acquires the wavefront data 500 of the received reflected beam 212 of the laser beam 21. In Zernike coefficient adjusting step ST4, the calculating section 101 calculates the values of the respective Zernike coefficients of the wavefront data 500, and the control unit 100 displays the values of the Zernike coefficients of the acquired wavefront data 500 on the display unit 110. Among the Zernike coefficients calculated by the calculating section 101 when the calculating section 101 approximates, by a Zernike polynomial, the wavefront data 500 acquired by the wavefront measuring unit 28, those Zernike coefficients other than the Zernike coefficient whose value has been changed also have their values changed.

The operator determines whether or not the values of the respective Zernike coefficients of the wavefront data 500 displayed on the display unit 110 are close enough to the desired values (step ST5). If the operator determines that the values of the respective Zernike coefficients of the wavefront data 500 displayed on the display unit 110 are not close enough to the desired values, then it is determined that the adjustment of the values of the respective Zernike coefficients of the wavefront data 500 has not generally been finished (step ST5: No), and control goes back to Zernike coefficient adjusting step ST4. If the values of the respective Zernike coefficients are close enough to the desired values, then the wavefront data 501 acquired by the wavefront measuring unit 28 are close enough to the ideal wavefront data 502, as illustrated in FIG. 7.

If the operator determines that the values of the respective Zernike coefficients of the wavefront data 500 displayed on the display unit 110 are close enough to the desired values, then it is determined that the adjustment of the values of the respective Zernike coefficients of the wavefront data 500 has generally been finished (step ST5: Yes), and control goes to Zernike coefficient back-calculating step ST6.

In Zernike coefficient adjusting step ST4, as described above, when the value of an arbitrary one of the Zernike coefficients is adjusted to a desired value, those Zernike coefficients other than the Zernike coefficient whose value has been changed among the Zernike coefficients calculated by the calculating section 101 when the calculating section 101 approximates, by a Zernike polynomial, the wavefront data 500 acquired by the wavefront measuring unit 28, also have their values changed. In the method of adjusting a phase pattern according to the first embodiment, Zernike coefficient adjusting step ST4 is repeated to repeatedly adjust arbitrary Zernike coefficients one by one and acquire the wavefront data 500 of the reflected beam 212 of the laser beam 21 by the wavefront measuring unit 28 until the values of the respective Zernike coefficients of the laser beam 21 acquired by the wavefront measuring unit 28 become close enough to the values of the respective Zernike coefficients of the ideal wavefront data 502 stored in the storage section 103. The method of adjusting a phase pattern according to the first embodiment thus repeats Zernike coefficient adjusting step ST4 until the wavefront data 500 acquired by the wavefront measuring unit 28 become close enough to the ideal wavefront data 502. A beam profile 401 illustrated in FIG. 6 is secondarily acquired when the wavefront measuring unit 28 acquires the wavefront data 500 illustrated in FIG. 7.

Zernike coefficient back-calculating step ST6 is a step in which the control unit 100 calculates back Zernike coefficients input to a phase pattern so that the values of Zernike coefficients of the reflected beam 212 measured by the wavefront measuring unit 28 will be the values of the Zernike coefficients of the ideal wavefront data 502, i.e., desired values, on the basis of the table of the correlation 300. Specifically, in Zernike coefficient back-calculating step ST6, the operator operates the input unit to select a Zernike coefficient whose value is to be adjusted, and when the control unit 100 receives the selected Zernike coefficient, the phase pattern generating section 102 calculates the difference between the value of the Zernike coefficient corresponding to the selected aberration of the wavefront data 501 where the values of the Zernike coefficients have generally been adjusted as illustrated in FIG. 7 and a desired value, and enters the calculated difference on the vertical axis of the correlation 300 illustrated in FIG. 4 by way of example.

In Zernike coefficient back-calculating step ST6, the phase pattern generating section 102 calculates the value on the horizontal axis that corresponds to the difference with the desired value, and calculates the value on the horizontal axis as the value of the Zernike coefficient of the ideal wavefront data 502. In Zernike coefficient back-calculating step ST6, the phase pattern generating section 102 changes the value of the selected Zernike coefficient input to the phase pattern to the calculated value on the horizontal axis of FIG. 4. Thereafter, the method of adjusting a phase pattern is ended.

For example, in Zernike coefficient back-calculating step ST6, if astigmatism 0° is selected, then when the desired value corresponding to the Zernike coefficient corresponding to astigmatism 0° is "0," as illustrated in FIG. 8, since the value of the Zernike coefficient corresponding to astigmatism 0° illustrated in FIG. 7 is "−0.037," the phase pattern generating section 102 calculates the difference between the value of the Zernike coefficient corresponding to astigmatism 0° and the desired value as "+0.037."

The phase pattern generating section 102 inputs "+0.037" to the value of the Zernike coefficient on the vertical axis of the correlation 300 illustrated in FIG. 4 and calculates the value "0.65" of the Zernike coefficient on the horizontal axis corresponding to "+0.037" on the vertical axis. In Zernike coefficient back-calculating step ST6, the phase pattern generating section 102 thus calculates the value of the Zernike coefficient corresponding to astigmatism 0° of the ideal wavefront data 502, i.e., the desired value. In Zernike coefficient back-calculating step ST6, the phase pattern generating section 102 changes the value of the Zernike coefficient corresponding to astigmatism 0° input to a phase pattern to the value "0.65."

As described above, the phase pattern generating section 102 finishes the method of adjusting a phase pattern when the values of the Zernike coefficients of the laser beam 21 acquired by the wavefront measuring unit 28 become the values of the Zernike coefficients of the ideal wavefront data 502 on the basis of the correlation 300 stored in the storage section 103. The wavefront measuring unit 28 that has received the reflected beam 212 of the laser beam 21 whose phase pattern has been adjusted in Zernike coefficient back-calculating step ST6 acquires the ideal wavefront data 502 illustrated in FIG. 8, secondarily acquires the beam profile 402 illustrated in FIG. 9, and outputs the ideal wavefront data 502 and the beam profile 402 to the control unit 100. The laser processing apparatus 1 displays the phase pattern having the Zernike coefficients of the values changed by the phase pattern generating section 102 on the display portion 241 and carries out the processing operation described above.

The method of adjusting a phase pattern according to the first embodiment may adjust the values of all the Zernike coefficients one by one or may not necessarily adjust the values of all the Zernike coefficients one by one when Zernike coefficient adjusting step ST4 is repeated. Further, the method of adjusting a phase pattern according to the first embodiment may adjust the values of the Zernike coefficients only once or a plurality of times when Zernike coefficient adjusting step ST4 is repeated.

Moreover, in the method of adjusting a phase pattern according to the first embodiment, it is desirable for the number of Zernike coefficients whose values are calculated back in Zernike coefficient back-calculating step ST6 to be less than the number of times Zernike coefficient adjusting step ST4 is repeated, e.g., it is desirable for the number of Zernike coefficients whose values are calculated back in Zernike coefficient back-calculating step ST6 to be one or two.

As described above, the laser processing apparatus 1 according to the first embodiment includes the beam splitter 26 for branching off the reflected beam 212 of the laser beam 21, the wavefront measuring unit 28 for receiving the reflected beam 212 of the laser beam 21 branched off by the beam splitter 26, and the calculating section 101. Therefore, the laser processing apparatus 1 according to the first embodiment can calculate the wavefront data 500, 501, and 502 of the laser beam 21 at the processing spot, i.e., the Zernike coefficients of the wavefront data 500, 501, and 502 of the laser beam 21 that has passed through the whole optical system of the laser processing apparatus 1, and hence can handle the wavefront data 500, 501, and 502 of the laser beam 21 as numerical values. As a result, the laser processing apparatus 1 is capable of quantitatively measuring the wavefront data 500, 501, and 502 of the laser beam 21.

Further, the laser processing apparatus 1 according to the first embodiment includes the phase pattern generating section 102 for calculating back Zernike coefficients input to a phase pattern to be displayed on the display portion 241 so that the Zernike coefficients of the laser beam 21 acquired by the wavefront measuring unit 28 will become the values of the Zernike coefficients of the ideal wavefront data 502, on the basis of the correlation 300 stored in the storage section 103. Therefore, the laser processing apparatus 1 can change the phase pattern to be displayed on the display portion 241 of the spatial light modulator 24 on the basis of the wavefront data 500 of the reflected beam 212, and can provide the laser beam 21 represented by the ideal wavefront data 502 at the processing spot. The laser processing apparatus 1 is advantageous in that it restrains the differences between laser beams 21 applied to workpieces 200 on different laser processing apparatuses 1.

Consequently, the laser processing apparatus 1 is advantageous in that it is able to obtain desired processed results by restraining the differences between laser beams 21 applied to workpieces 200 on different laser processing apparatuses 1.

In addition, in the laser processing apparatus 1, the wavefront measuring unit 28 receives the reflected beam 212 that passes through the condensing lens 23 and is reflected by the reflecting surface 252 of the concave mirror 25 without being transmitted through the workpiece 200 and reflected by the reverse side 205. As a consequence, the laser processing apparatus 1 acquires the wavefront data 500 of the laser beam 21 that has passed through the whole optical system of the laser beam applying unit 20 and not through, i.e., is prevented from passing through, objects other than the optical system of the laser beam applying unit 20. As a result, the laser processing apparatus 1 is capable of accurately quantitatively measuring the wavefront data 500 of the laser beam 21 from the laser beam applying unit 20.

The method of adjusting a phase pattern according to the first embodiment is advantageous in that since Zernike coefficient adjusting step ST4 is repeated until the wavefront data 500 acquired by the wavefront measuring unit 28 are close enough to the ideal wavefront data 502, the method is able to restrain the differences between laser beams 21 applied to workpieces 200 on different laser processing apparatuses 1.

Furthermore, the method of adjusting a phase pattern according to the first embodiment is advantageous in that since the method includes Zernike coefficient back-calculating step ST6 of calculating back Zernike coefficients input to a phase pattern to be displayed on the display portion 241 so that the Zernike coefficients of the laser beam 21 acquired by the wavefront measuring unit 28 are desired values, it is possible to provide the laser beam 21 represented by the ideal wavefront data 502 at the processing spot.

Second Embodiment

Figure 10:
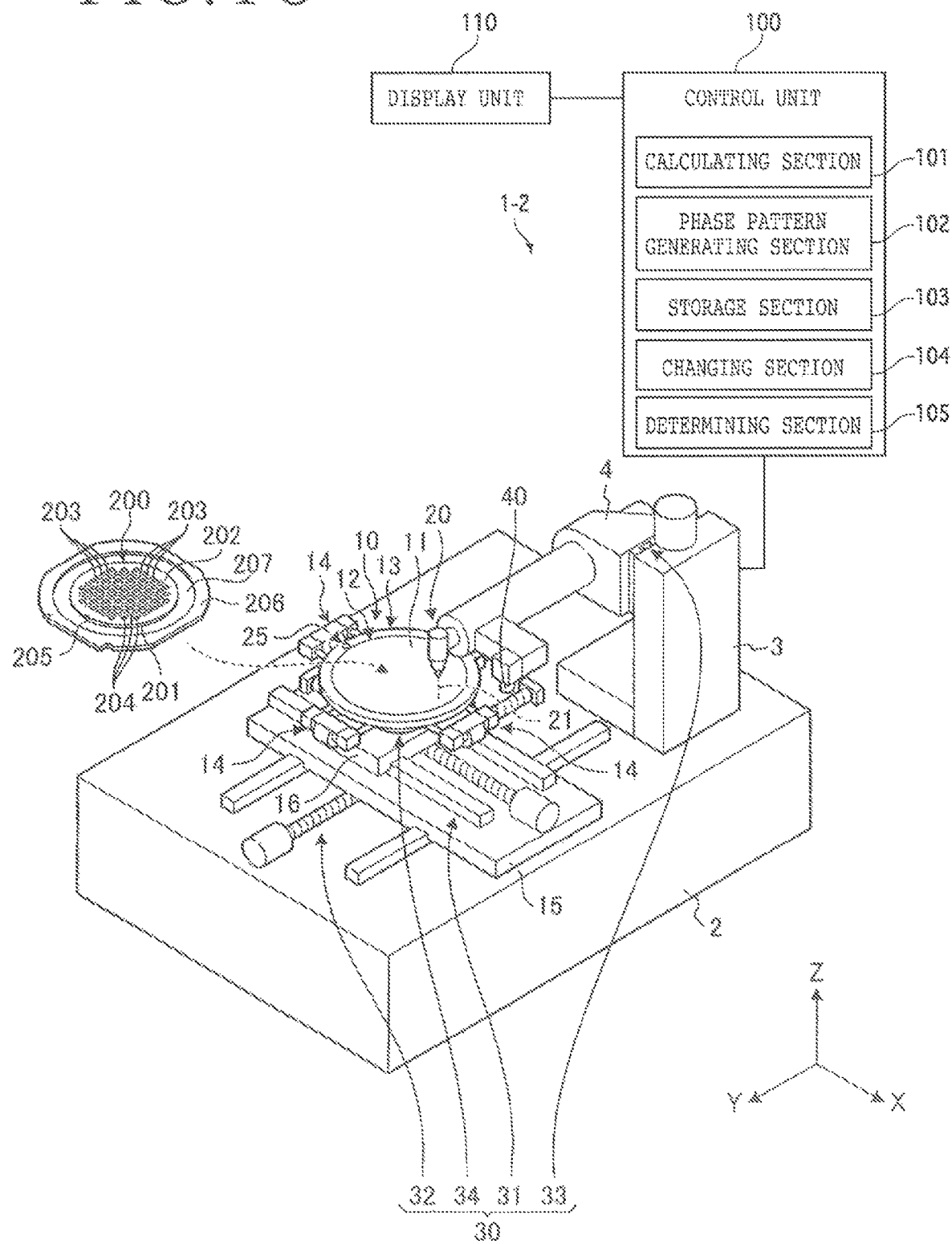
FIG. 10 is a perspective view, partly in block form, illustrating a configurational example of a laser processing apparatus according to a second embodiment of the present invention.
Figure 11:
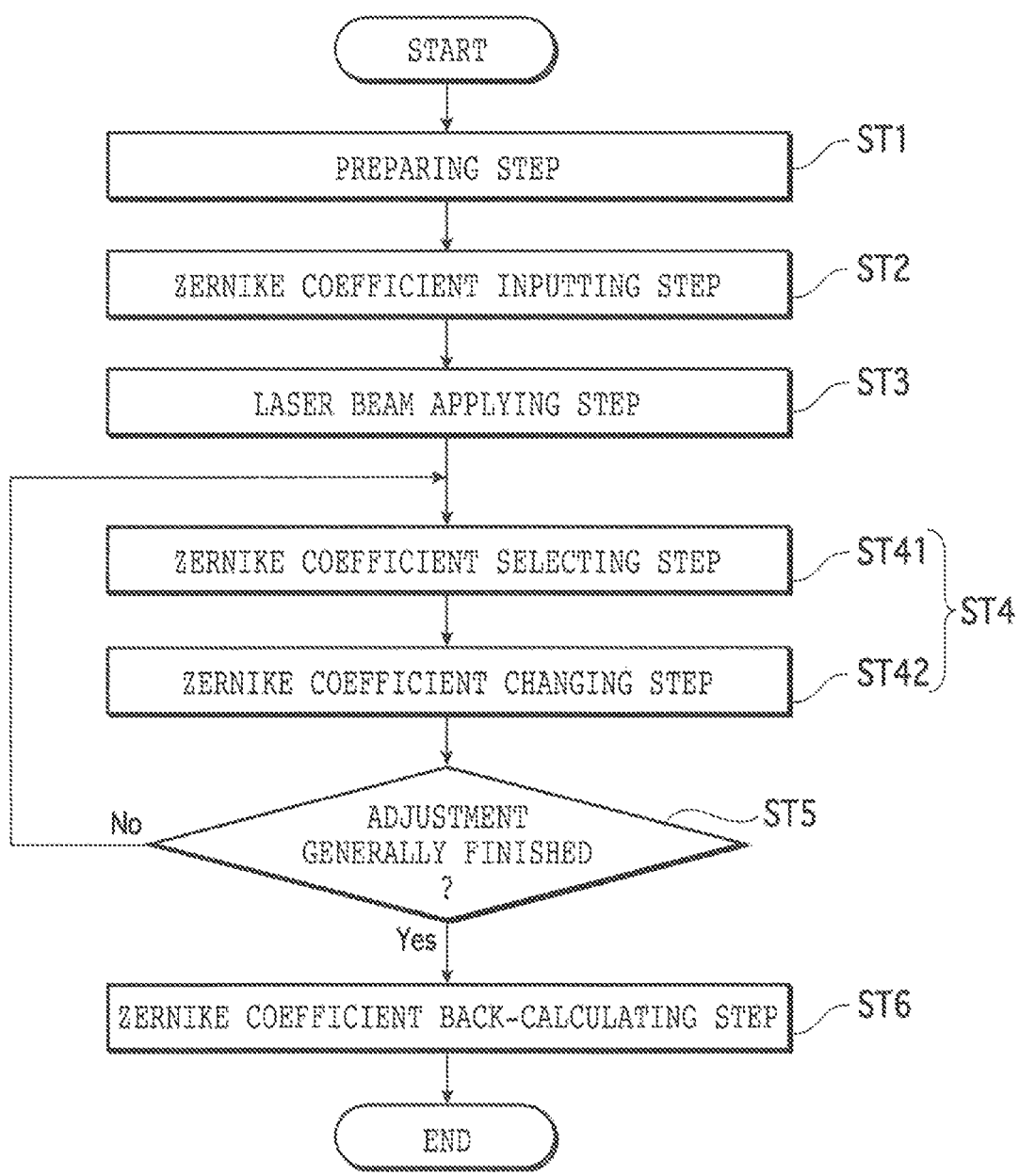
FIG. 11 is a flowchart of a sequence of a method of adjusting a phase pattern according to the second embodiment.

A laser processing apparatus and a method of adjusting a phase pattern according to a second embodiment of the present invention will be described below with reference to FIGS. 10 and 11. FIG. 10 illustrates in perspective, partly in block form, a configurational example of the laser processing apparatus according to the second embodiment. FIG. 11 illustrates a flowchart of a sequence of the method of adjusting a phase pattern according to the second embodiment. Those parts illustrated in FIGS. 10 and 11 which are identical to those according to the first embodiment are denoted by identical reference characters, and will not be described in detail below.

As illustrated in FIG. 10, a laser processing apparatus, denoted by 1-2, according to the second embodiment is essentially the same as the laser processing apparatus 1 according to the first embodiment except that a control unit 100 includes a changing section 104 and a determining section 105, and Zernike coefficient adjusting step ST4 is carried out by the changing section 104, i.e., the control unit 100, and step ST5 is carried out by the determining section 105, i.e., the control unit 100.

The changing section 104 changes any one of the Zernike coefficients of the wavefront data 500 acquired by the wavefront measuring unit 28. The determining section 105 determines whether or not the wavefront data 500 measured by the wavefront measuring unit 28 are close enough to the ideal wavefront data 502. The functions of the changing section 104 and the determining section 105 are realized by the arithmetic processing apparatus as the arithmetic processing apparatus performs arithmetic processing operations according to computer programs stored in the storage apparatus.

The phase pattern generating section 102 of the control unit 100 of the laser processing apparatus 1-2 according to the second embodiment generates a phase pattern having Zernike coefficients that are of predetermined values and displays the generated phase pattern on the display portion 241 of the spatial light modulator 24, as with the first embodiment. The phase pattern generating section 102 accepts the predetermined values of the Zernike coefficients input from the input unit, and when accepting the values of all the Zernike coefficients, the phase pattern generating section 102 generates a phase pattern having the Zernike coefficients that are of the accepted values. Then, the phase pattern generating section 102 displays the generated phase pattern on the display portion 241. Furthermore, if the changing section 104 changes the value of an arbitrary one of the Zernike coefficients, the phase pattern generating section 102 according to the second embodiment generates a phase pattern including the Zernike coefficient of the changed value and displays the generated phase pattern on the display portion 241.

Zernike coefficient adjusting step ST4 of the method of adjusting a phase pattern according to the second embodiment includes Zernike coefficient selecting step ST41 and Zernike coefficient changing step ST42, as illustrated in FIG. 11. Zernike coefficient selecting step ST41 is a step in which the changing section 104 selects an arbitrary one of the Zernike coefficients of the wavefront data 500 acquired by the wavefront measuring unit 28.

According to the second embodiment, in Zernike coefficient selecting step ST41, the changing section 104 selects, as an arbitrary Zernike coefficient, the Zernike coefficient whose difference from the values of the Zernike coefficients of the ideal wavefront data 502 is the largest among the Zernike coefficients, calculated by the calculating section 101, of the wavefront data 500 acquired by the wavefront measuring unit 28. In Zernike coefficient selecting step ST41, the changing section 104 may not necessarily select the Zernike coefficient with the largest difference as an arbitrary Zernike coefficient. According to the present invention, the changing section 104 may select the Zernike coefficient that has the largest effect on processing as an arbitrary Zernike coefficient.

Zernike coefficient changing step ST42 is a step in which the changing section 140 changes the value of the selected arbitrary Zernike coefficient. According to the second embodiment, in Zernike coefficient changing step ST42, the changing section 104 changes the value of the selected arbitrary Zernike coefficient to the value of a Zernike coefficient of the ideal wavefront data 502. In Zernike coefficient changing step ST42, then, the phase pattern generating section 102 of the control unit 100 generates a phase pattern including the value of the changed Zernike coefficient and displays the generated phase pattern on the display portion 241.

In Zernike coefficient changing step ST42, the wavefront measuring unit 28 receives the reflected beam 212 of the laser beam 21 whose optical characteristics have been adjusted by the phase pattern having the Zernike coefficients of the values changed by the wavefront measuring unit 28, and acquires the wavefront data 500 of the received reflected beam 212 of the laser beam 21. In Zernike coefficient changing step ST42, the calculating section 101 calculates the values of the respective Zernike coefficients of the wavefront data 500, and the control unit 100 displays the values of the respective Zernike coefficients of the acquired wavefront data 500 on the display unit 110.

The determining section 105 of the control unit 100 determines whether or not the values of the respective Zernike coefficients of the wavefront data 500 calculated by the calculating section 101 are close enough to the desired values, thereby determining whether or not the wavefront data 500 measured by the wavefront measuring unit 28 and calculated by the calculating section 101 are close enough to the ideal wavefront data 502 (step ST5). According to the second embodiment, the determining section 105 calculates the differences between the values of the respective Zernike coefficients of the wavefront data 500 calculated by the calculating section 101 and the values of the respective Zernike coefficients of the ideal wavefront data 502, and if the determining section 105 determines that the sum of the calculated differences exceeds a preset predetermined value, the determining section 105 determines that the wavefront data 500 measured by the wavefront measuring unit 28 are not close enough to the ideal wavefront data 502 (step ST5: No). Control then goes back to Zernike coefficient selecting step ST41. In the laser processing apparatus 1-2 according to the second embodiment, therefore, the laser oscillator 22 continues to emit the laser beam 21, and the changing section 104 changes an arbitrary one of the Zernike coefficients and the phase pattern generating section 102 displays a phase pattern including the changed Zernike coefficient on the display portion 241 of the spatial light modulator 24, alternately repeatedly until the determining section 105 determines that the wavefront data 500 and 501 measured by the wavefront measuring unit 28 are close enough to the ideal wavefront data 502.

In step ST5, the determining section 105 may not necessarily determine whether or not the wavefront data 500 are close enough to the ideal wavefront data 502 on the basis of the sum of the differences between the calculated Zernike coefficients of the wavefront data 500 and the Zernike coefficients of the ideal wavefront data 502. According to the present invention, the determining section 105 may determine whether or not the wavefront data 500 are close enough to the ideal wavefront data 502 on the basis of whether or not the difference between the ideal value and the actual value of a selected Zernike coefficient is equal to or smaller than a predetermined value and whether or not the sum of the differences is equal to or smaller than a predetermined value. In this case, if the difference between the ideal value and the actual value of the selected Zernike coefficient is equal to or smaller than the predetermined value and if the sum of the differences is equal to or smaller than the predetermined value, then the determining section 105 determines that the wavefront data 501 measured by the wavefront measuring unit 28 are close enough to the ideal wavefront data 502, and if the difference between the ideal value and the actual value of the selected Zernike coefficient is in excess of the predetermined value or if the sum of the differences is in excess of the predetermined value, then the determining section 105 determines that the wavefront data 501 measured by the wavefront measuring unit 28 are not close enough to the ideal wavefront data 502.

According to the second embodiment, if determining that the sum of the calculated differences is equal to or smaller than the preset predetermined value, the determining section 105 determines that the wavefront data 501 measured by the wavefront measuring unit 28 are close enough to the ideal wavefront data 502 (step ST5: Yes). Control then goes to Zernike coefficient back-calculating step ST6. According to the second embodiment, in Zernike coefficient back-calculating step ST6, the phase pattern generating section 102 of the control unit 100 selects the Zernike coefficient with the largest difference with the Zernike coefficient of the ideal wavefront data 502 as a Zernike coefficient whose value is to be adjusted, and adjusts the value using the correlation 300 that is illustrated in FIG. 4 by way of example, in the same manner as with the first embodiment.

The laser processing apparatus 1-2 according to the second embodiment includes the beam splitter 26, the wavefront measuring unit 28, and the calculating section 101, as with the first embodiment, and the method of adjusting a phase pattern according to the second embodiment is carried out by the laser processing apparatus 1-2. Therefore, the laser processing apparatus 1-1 and the method of adjusting a phase pattern according to the second embodiment can calculate the wavefront data 500, 501, and 502 of the laser beam 21 at the processing spot, i.e., the Zernike coefficients of the wavefront data 500, 501, and 502 of the laser beam 21 that has passed through the whole optical system of the laser processing apparatus 1, and hence are capable of quantitatively measuring the wavefront data 500, 501, and 502 of the laser beam 21.

Furthermore, in the laser processing apparatus 1-2 according to the second embodiment, the laser oscillator 22 continues to emit the laser beam 21, and the changing section 104 changes an arbitrary one of the Zernike coefficients and the phase pattern generating section 102 displays a phase pattern including the changed Zernike coefficient on the display portion 241 of the spatial light modulator 24, alternately repeatedly until the determining section 105 determines that the wavefront data 500 and 501 measured by the wavefront measuring unit 28 are close enough to the ideal wavefront data 502. Therefore, the laser processing apparatus 1-2 can provide the laser beam 21 represented by the ideal wavefront data 502 at the processing spot. The laser processing apparatus 1-2 is advantageous in that it restrains the differences between laser beams 21 applied to workpieces 200 on different laser processing apparatuses 1.

Modifications

Figure 12:
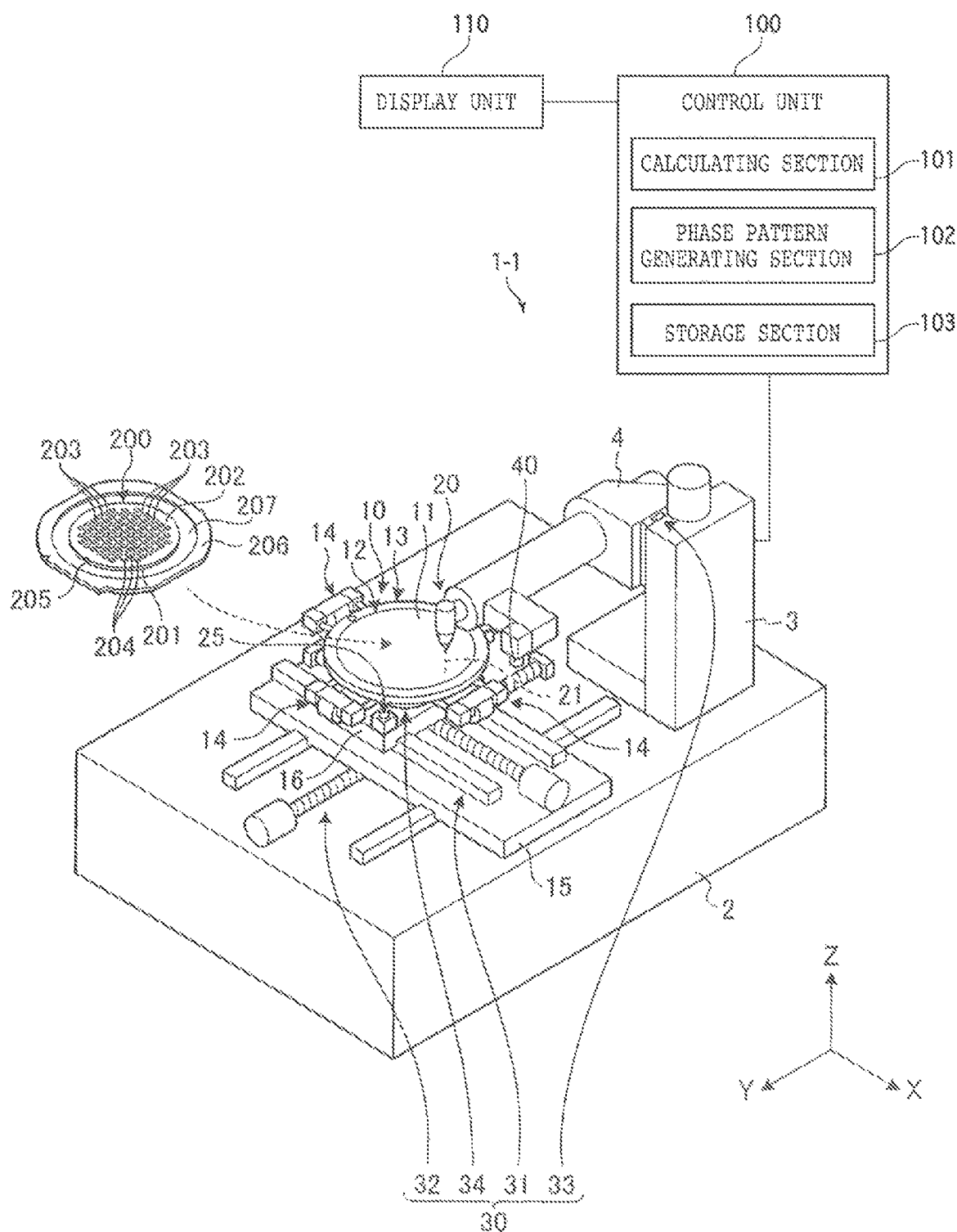
FIG. 12 is a perspective view, partly in block form, illustrating a configurational example of a laser processing apparatus according to a modification of the first embodiment.

A laser processing apparatus according to a modification of the first and second embodiments of the present invention will be described below with reference to FIG. 12. FIG. 12 illustrates in perspective the laser processing apparatus according to the modification of the first and second embodiments. Those parts illustrated in FIG. 12 which are identical to those according to the first embodiment are denoted by identical reference characters, and will not be described in detail below.

As illustrated in FIG. 12, a laser processing apparatus, denoted by 1-1, according to the modification is essentially the same as the laser processing apparatus 1 according to the first embodiment except that the concave mirror 25 is disposed in a predetermined position on the second movable plate 16, and the condensing lens 23 of the laser beam applying unit 20 faces the reflecting surface 252 of the concave mirror 25 on the second movable plate 16 in the Z-axis directions in preparing step ST1.

The laser processing apparatus 1-1 according to the modification includes the beam splitter 26, the wavefront measuring unit 28, the calculating section 101, and the phase pattern generating section 102. Therefore, the laser processing apparatus 1-1 is capable of quantitatively measuring the wavefront data 500, 501 and 502 of the laser beam 21, changing the phase pattern to be displayed on the display portion 241 of the spatial light modulator 24 on the basis of the wavefront data 500, 501 and 502 of the reflected beam 212, providing the laser beam 21 represented by the ideal wavefront data 502 at the processing spot, and restraining the differences between laser beams 21 applied to workpieces 200 on different laser processing apparatuses 1. Consequently, the laser processing apparatus 1-1 is advantageous in that it can restrain the differences between laser beams 21 applied to workpieces 200 on different laser processing apparatuses 1, obtaining desired processed results, as with the first embodiment. The laser processing apparatus 1-1 according to the modification of the present invention illustrated in FIG. 12 may allow the control unit 100 to include the changing section 104 and the determining section 105, as with the second embodiment.

The present invention is not limited to the above embodiments. In other words, various changes and modifications may be made without departing from the scope of the invention. For example, the laser processing apparatuses 1 and 1-1 and the method of adjusting a phase pattern according to the present invention may repeat Zernike coefficient back-calculating step ST6 a plurality of times while changing Zernike coefficients whose values are to be calculated back and may repeat Zernike coefficient back-calculating step ST6 a plurality of times without carrying out Zernike coefficient adjusting step ST4. Moreover, according to the present invention, the method of adjusting a phase pattern carried out by the laser processing apparatus 1 according to the first embodiment may have Zernike coefficient adjusting step ST4 and step ST5 carried out in the same manner as with the second embodiment.

The present invention is not limited to the details of the above described preferred embodiments. The scope of the invention is defined by the appended claims and all changes and modifications as fall within the equivalence of the scope of the claims are therefore to be embraced by the invention.

What is claimed is:
1. A laser processing apparatus comprising:
   a chuck table for holding a workpiece thereon;
   a laser beam applying unit for applying a laser beam to the workpiece held on the chuck table; and
   a control unit, wherein the laser beam applying unit includes
   a laser oscillator for oscillating a laser,
   a reflecting mirror, a wave plate and a beam expander successively disposed downstream of the laser oscillator for propagating the laser beam emitted from the laser oscillator,
   a spatial light modulator disposed downstream of the wave plate for receiving the propagated laser beam from the wave plate, and having a display portion for displaying a phase pattern for adjusting the optical characteristics of the laser beam,
   a relay optical system having a relay lens downstream of the spatial light modulator for directly receiving and relaying the adjusted laser beam from the spatial light modulator,
   a condensing lens for converging the laser beam emitted from the relay optical system and transmitting the converged laser beam in a first direction,
   a concave mirror positioned to have a focal point at a focused spot of the condensing lens and having a spherical reflecting surface for reflecting the laser beam transmitted in the first direction by the condensing lens,
   a beam splitter for transmitting therethrough the laser beam emitted from the relay optical system toward the condensing lens and branching off the laser beam converged by the condensing lens in the first direction and reflected by the reflecting surface of the concave mirror through the condensing lens in a second direction different from the first direction, and
   a wavefront measuring unit for receiving the laser beam reflected by the reflecting surface of the concave mirror, transmitted through the condensing lens in the second direction and branched off by the beam splitter, and acquiring wavefront data representing a spatial phase distribution of the laser beam, and
wherein the control unit changes the phase pattern displayed on the display portion of the spatial light modulator on a basis of the wavefront data measured by the wavefront measuring unit, and includes
   a calculating section for approximating, by a Zernike polynomial, the wavefront data measured by the wavefront measuring unit and representing the spatial phase distribution of the laser beam and for calculating Zernike coefficients of the laser beam after being passed through the condensing lens in the first direction and the second direction,
   a phase pattern generating section for generating a phase pattern having predetermined Zernike coefficients input by an operator and displaying the generated phase pattern on the display portion of the spatial light modulator, and
   a storage section for storing in advance a correlation between the predetermined Zernike coefficients input to the phase pattern by the operator and the Zernike coefficients of the laser beam measured by the wavefront measuring unit after being passed through the condensing lens in the first direction and the second direction when the predetermined phase pattern to which the Zernike coefficients are input is displayed on the display portion of the spatial light modulator.

2. The laser processing apparatus according to claim 1, wherein the concave mirror is disposed in a peripheral edge portion of the chuck table.

3. The laser processing apparatus according to claim 1, wherein
   the phase pattern generating section calculates back Zernike coefficients input to the phase pattern to be displayed on the display portion so that the Zernike coefficients of the laser beam measured by the wavefront measuring unit are desired values, on a basis of a table of the correlation stored in the storage section.

4. The laser processing apparatus according to claim 1, wherein the control unit further includes
   a changing section for changing an arbitrary one of the Zernike coefficients of the wavefront data measured by the wavefront measuring unit, and
   a determining section for determining whether the wavefront data measured by the wavefront measuring unit are close enough to ideal wavefront data input by an operator, and
wherein the laser oscillator continues to emit the laser beam, and the changing section changes an arbitrary one of the Zernike coefficients and the phase pattern generating section displays a phase pattern including the changed Zernike coefficient on the display portion of the spatial light modulator, alternately repeatedly until the determining section determines that the wavefront data measured by the wavefront measuring unit are close enough to the ideal wavefront data.

5. A method of adjusting a phase pattern to be displayed on a display portion of a laser processing apparatus including a laser beam applying unit for applying a laser beam to a workpiece held on a chuck table,
   the laser beam applying unit including
      a laser oscillator for oscillating a laser,
      a beam expander, a reflecting mirror and a wave plate successively disposed downstream of the laser oscillator for propagating the laser beam emitted from the laser oscillator,
      a spatial light modulator disposed downstream of the wave plate for receiving the propagated laser beam directly from the wave plate, and having a display portion for displaying a phase pattern for adjusting the optical characteristics of the laser beam,
      a relay optical system having a relay lens downstream of the spatial light modulator for directly receiving and relaying the adjusted laser beam from the spatial light modulator,
      a condensing lens for converging the laser beam emitted from the relay optical system and transmitting the converged laser beam in a first direction,
      a concave mirror positioned to have a focal point at a focused spot of the condensing lens and having a spherical reflecting surface for reflecting the laser beam transmitted in the first direction by the condensing lens,
      a beam splitter for transmitting therethrough the laser beam emitted from the relay optical system toward the condensing lens and branching off the laser beam converged by the condensing lens in the first direction and reflected by the reflecting surface of the concave mirror through the condensing lens in a second direction different from the first direction,
      a wavefront measuring unit for receiving the laser beam reflected by the reflecting surface of the concave mirror, transmitted through the condensing lens in the second direction and branched off by the beam splitter and acquiring wavefront data representing a spatial phase distribution of the laser beam, and the method of adjusting the phase pattern comprising:

approximating, by a Zernike polynomial, the wavefront data measured by the wavefront measuring unit and representing the spatial phase distribution of the laser beam and for calculating Zernike coefficients of the laser beam after being passed through the condensing lens in the first direction and the second direction, generating a phase pattern having predetermined Zernike coefficients input by an operator and displaying the phase pattern having predetermined Zernike coefficients on the display portion of the spatial light modulator;

storing in advance a correlation between the predetermined Zernike coefficients input to the phase pattern by the operator and the Zernike coefficients of the laser beam measured by the wavefront measuring unit after being passed through the condensing lens in the first direction and the second direction when the predetermined phase pattern to which the Zernike coefficients are input is displayed on the display portion of the spatial light modulator;

a laser beam applying step of emitting the laser beam from the laser oscillator, propagating the laser beam through the beam expander, the reflecting mirror, the wave plate, the spatial light modulator, the relay optical system and the condensing lens in successive order, and acquiring wavefront data thereof by the wavefront measuring unit; and a Zernike coefficient adjusting step of changing an arbitrary one of the Zernike coefficients of the wavefront data measured by the wavefront measuring unit and displaying a phase pattern including the changed Zernike coefficient on the display portion of the spatial light modulator, wherein the Zernike coefficient adjusting step is repeated until the wavefront data measured by the wavefront measuring unit are close enough to ideal wavefront data.

6. The method according to claim 5, further comprising:
a Zernike coefficient back-calculating step of calculating back Zernike coefficients input to the phase pattern to be displayed on the display portion so that the Zernike coefficients of the laser beam measured by the wavefront measuring unit are desired values, on a basis of a table of a correlation between Zernike coefficients input to the phase pattern and Zernike coefficients of the laser beam measured by the wavefront measuring unit when the phase pattern to which the Zernike coefficients are input is displayed on the display portion of the spatial light modulator.

* * * * *